(12) United States Patent
Xu

(10) Patent No.: US 12,147,633 B2
(45) Date of Patent: Nov. 19, 2024

(54) TOUCH DISPLAY PANEL AND TOUCH DISPLAY DEVICE

(71) Applicant: Wuhan China Star Optoelectronics Semiconductor Display Technology Co., Ltd., Wuhan (CN)

(72) Inventor: Zuzhao Xu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/785,446

(22) PCT Filed: May 23, 2022

(86) PCT No.: PCT/CN2022/094435
§ 371 (c)(1),
(2) Date: Jun. 15, 2022

(87) PCT Pub. No.: WO2023/206675
PCT Pub. Date: Nov. 2, 2023

(65) Prior Publication Data
US 2024/0160324 A1 May 16, 2024

(30) Foreign Application Priority Data
Apr. 29, 2022 (CN) .......................... 202210472333.9

(51) Int. Cl.
*G06F 3/044* (2006.01)
*G06F 3/047* (2006.01)

(52) U.S. Cl.
CPC ............ *G06F 3/0443* (2019.05); *G06F 3/047* (2013.01)

(58) Field of Classification Search
CPC ........ G06F 3/0412; G06F 3/041; G06F 3/044; G06F 3/0446; G06F 3/0443; G06F 3/047; G06F 3/0448; G06F 3/0445; G06F 3/0444
See application file for complete search history.

(56) References Cited

U.S. PATENT DOCUMENTS 11,249,608 B2 * 2/2022 Xu .................... G06F 3/0446
2021/0005704 A1 1/2021 Jeon

FOREIGN PATENT DOCUMENTS

CN 105975141 A 9/2016
CN 209103795 U 7/2019
(Continued)

OTHER PUBLICATIONS

International Search Report in International application No. PCT/CN2022/094435, mailed on Dec. 15, 2022.
(Continued)

*Primary Examiner* — Koosha Sharifi-Tafreshi
(74) *Attorney, Agent, or Firm* — Nathan & Associates; Menachem Nathan

(57) ABSTRACT

The present application provides a touch display panel and a touch display device. Dummy lines in a same layer as touch signal lines are added in a wiring layer. A difference between a number of electrode lines disposed between two adjacent touch signal lines and a number of electrode lines disposed between two adjacent dummy lines is less than or equal to 1. Therefore, a distribution density of the touch signal lines is close to or same as a distribution density of the dummy lines. Accordingly, the present application can reduce a structural wiring difference between an area where the touch signal lines are located and an area where the dummy lines are located in the touch display panel.

18 Claims, 5 Drawing Sheets

(56) References Cited

FOREIGN PATENT DOCUMENTS

| CN | 213545245 U | 6/2021 |
|---|---|---|
| CN | 214098387 U | 8/2021 |

OTHER PUBLICATIONS

Written Opinion of the International Search Authority in International application No. PCT/CN2022/094435, mailed on Dec. 15, 2022.

* cited by examiner

TOUCH DISPLAY PANEL AND TOUCH DISPLAY DEVICE

FIELD OF DISCLOSURE

The present application relates to a field of touch display technology and in particular, to a touch display panel and a touch display device.

DESCRIPTION OF RELATED ART

At present, touch and display driver integration (TDDI) is a significant research focus in the touch display field. Its main feature is to integrate a touch function and a display function that were originally independent of each other, thereby simplifying structures and manufacturing processes, and improving touch sensitivity.

A touch display panel needs to be tested for reliability after being manufactured. However, after the reliability test, dark lines appear in a touch area of a touch display panel, which affects display quality.

SUMMARY

The present application provides a touch display panel and a touch display device, so as to reduce dark lines that appear after the touch display panel undergoes a reliability test.

In one aspect, the present application provides a touch display panel, including:

a wiring layer and an electrode layer, wherein the wiring layer and the electrode layer are stacked on the encapsulation layer of the touch display panel, the wiring layer includes a plurality of touch signal lines and a plurality of dummy lines, the plurality of touch signal lines and the plurality of the dummy lines are arranged in parallel, and the electrode layer includes a plurality of electrode lines, wherein in a projection of the wiring layer and the electrode layer projected on the encapsulation layer, at least one electrode line is disposed between two adjacent touch signal lines, and at least one electrode line is disposed between two adjacent dummy lines, and wherein a difference between a number of the at least one electrode line disposed between two adjacent touch signal lines and a number of the at least one electrode line disposed between two adjacent dummy lines is less than or equal to 1; and an insulating layer disposed between the wiring layer and the electrode layer, wherein a plurality of conductive holes are defined in the insulating layer, and the plurality of electrode lines and the plurality of touch signal lines are connected through the plurality of conductive holes.

In another aspect, the present application provides a touch display device, including:

a controller, a driving circuit, and a touch display panel, wherein the controller is connected to the driving circuit, and the driving circuit is connected to the touch display panel;

wherein the touch display panel includes:

a wiring layer and an electrode layer, wherein the wiring layer and the electrode layer are stacked on the encapsulation layer of the touch display panel, the wiring layer includes a plurality of touch signal lines and a plurality of dummy lines, the plurality of touch signal lines and the plurality of the dummy lines are arranged in parallel, and the electrode layer includes a plurality of electrode lines, wherein in a projection of the wiring layer and the electrode layer projected on the encapsulation layer, at least one electrode line is disposed between two adjacent touch signal lines, and at least one electrode line is disposed between two adjacent dummy lines, and wherein a difference between a number of the at least one electrode line disposed between two adjacent touch signal lines and a number of the at least one electrode line disposed between two adjacent dummy lines is less than or equal to 1; and an insulating layer disposed between the wiring layer and the electrode layer, wherein a plurality of conductive holes are defined in the insulating layer, and the plurality of electrode lines and the plurality of touch signal lines are connected through the plurality of conductive holes.

Advantages of the Present Application

In the touch display panel of the present application, the dummy lines in the same layer as the touch signal lines are added in the wiring layer. In the projection of the wiring layer and the electrode layer projected on the encapsulation layer, the difference between the number of the electrode lines disposed between the touch signal lines and the number of the electrode lines disposed between two adjacent dummy lines is less than or equal to 1, so that a distribution density of the touch signal lines is close to or same as a distribution density of the dummy lines. In this way, the present application reduces a structural wiring difference between an area where the touch signal lines are located and an area where the dummy lines are located in the touch display panel, thus reducing a difference in reflection performance between the area where the touch signal lines are located and the area where the dummy lines are located. Accordingly, after the touch display panel undergoes the reliability test, the present application can effectively reduce dark lines which appear due to the difference in the reflection performance between different areas after the touch display panel undergoes a reliability test, so as to improve the display performance of the touch display panel.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

For a more complete understanding of the present application and its beneficial effects, the following description is made with reference to the accompanying drawings, wherein the same reference numerals denote the same components in the following description.

100 touch display panel; 10 display area; 20 non-display area; 11 touch wiring area; 12 touch sensing area; 30 encapsulation layer; 41 touch signal line; 42 dummy line; 50 insulating layer; 61 touch electrode; 62 dummy electrode.

DETAILED DESCRIPTION OF EMBODIMENTS

The technical solutions in the present application are clearly and completely described below with reference to the accompanying drawings and in conjunction with specific embodiments. Obviously, the described embodiments are only some of the embodiments of the present application, but not all of the embodiments. Based on the embodiments of the present application, all other embodiments obtained by those skilled in the art without creative efforts shall fall within the protection scope of the present application.

The present application provides a touch display panel 100 and a display device to improve a problem of dark lines that appear after the touch display panel 100 undergoes a reliability test. It will be described below with reference to the accompanying drawings.

The touch display panel 100 of the present application is a thin film transistor touch display panel. The touch display panel 100 can include a flexible substrate, a thin film transistor layer, an organic light emitting layer, a thin film encapsulation layer, a touch layer, a color filter layer, and a glass cover plate disposed sequentially from bottom to top. The thin film transistor layer includes a plurality of thin film transistors disposed on the flexible substrate, an organic planarization layer covering the thin film transistors, an anode layer disposed on the organic planarization layer, and a pixel definition layer disposed on the anode layer. Each thin film transistor includes an active layer, a gate insulating layer, a gate, an interlayer insulating layer, and a source-drain layer which are sequentially stacked from bottom to top. A drain and a source of the thin film transistor are located in the source-drain layer. The touch layer includes a wiring layer and an electrode layer.

Figure 1:
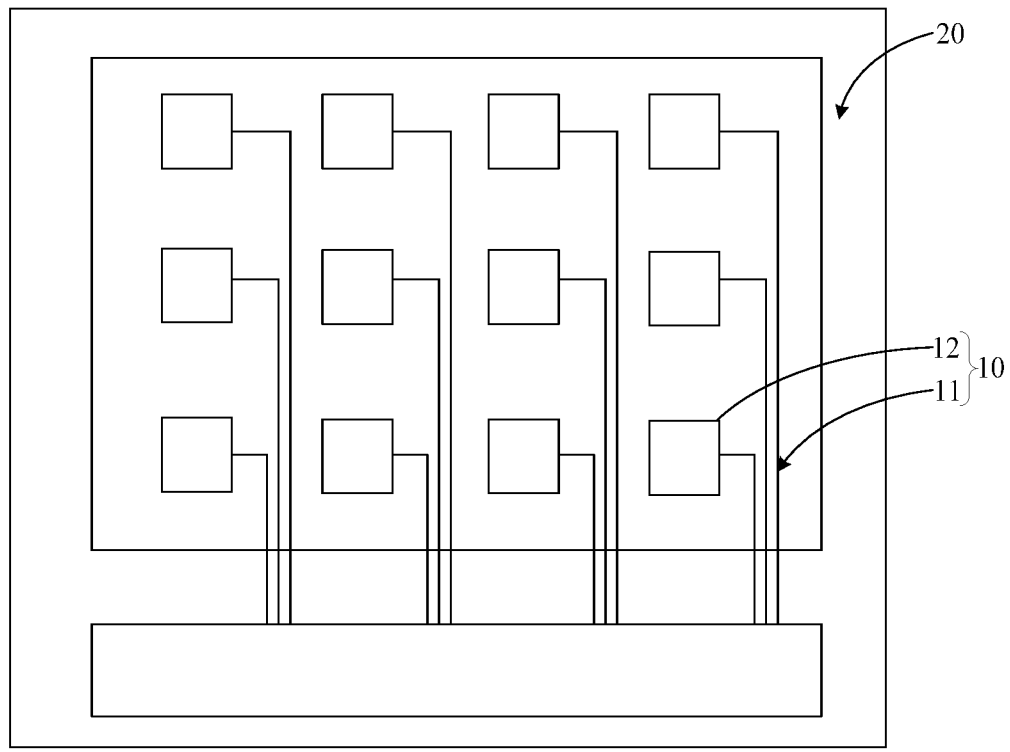
FIG. 1 is a schematic plan view of a touch display panel according to one embodiment of the present application.

Please refer to FIG. 1, which is a schematic plan view of the touch display panel 100 according to one embodiment of the present application. The touch display panel 100 includes a display area 10 and a non-display area 20. The display area 10 includes a touch wiring area 11 and a touch sensing area 12. The non-display area 20 is provided with a touch integrated circuit, and the display area 10 is provided with touch electrodes 61 and touch signal lines 41. One end of each touch signal line 41 is electrically connected to one of the touch electrodes 61, and the other end of each touch signal line 41 is electrically connected to the touch integrated circuit. The touch display panel 100 of the present application is a self-capacitive touch display panel 100. A touch principle of the self-capacitive touch display panel 100 is as follows. The self-capacitive touch display panel 100 includes an electrode array consisting of the self-capacitive touch electrodes 61. Each self-capacitive touch electrode 61 forms a capacitance with the ground. When a finger touches the self-capacitive touch panel, a capacitance of the finger will be added to a panel capacitance, so that the panel capacitance increases. During touch detection, the self-capacitive touch panel sequentially detects the self-capacitive touch electrodes 61 in a horizontal direction and the self-capacitive touch electrodes 61 in a vertical direction, and determines horizontal and vertical coordinates of a touch point according to a change in capacitance before and after the touch, thereby obtaining plane touch coordinates to obtain position information of the touch point.

Figure 2:
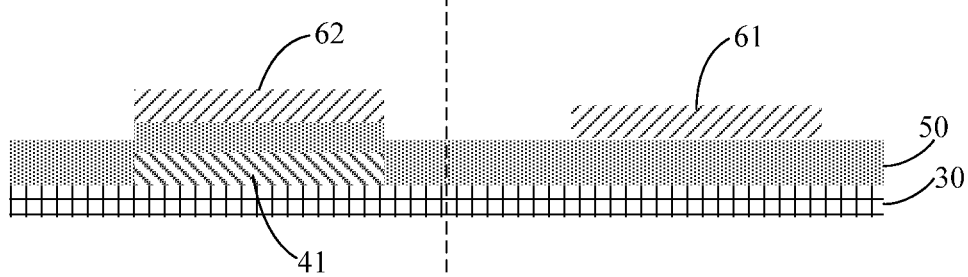
FIG. 2 is a schematic cross-sectional view of a conventional touch display panel.

Please refer to FIG. 2 showing conventional techniques. FIG. 2 is a schematic cross-sectional view of the conventional touch display panel 100. The touch display panel 100 includes a wiring layer formed on the encapsulation layer 30, an insulating layer 50 covering the wiring layer, and an electrode layer formed on the insulating layer 50. The wiring layer only includes the touch signal lines 41 disposed in a touch wiring area 11. No wiring structures are disposed in a touch sensing area 12. Conductive holes are defined in the insulating layer 50, and the touch signal lines 41 are electrically connected to the touch electrodes 61 through the conductive holes, so as to transmit touch signals generated by the touch electrodes 61 to the touch integrated circuit. The touch integrated circuit can be, for example, a flexible printed circuit board.

After the touch display panel 100 is fabricated to be an initial product, a reliability test needs to be performed to ensure a factory pass rate of the touch display panel 100. The reliability test can be a double 85 test, that is, the touch display panel 100 is tested in a constant temperature and humidity test box with a temperature of 85° C. and a humidity of 85%. The double 85 test is used to make sure that the touch display panel 100 can withstand the effects of negative temperatures after high temperature and high humidity, as well as fatigue and thermal failure caused by repeated temperature changes.

After the conventional touch display panel 100 undergoes the reliability test, dark lines (patterns) may appear in some areas. The dark lines are caused by a difference in reflective performance between the touch sensing area 12 and the touch wiring area 11 in the wiring layer of the touch display panel 100 due to a structural wiring difference between the touch sensing area 12 and the touch wiring area 11. The difference is that the wiring layer includes the touch signal lines 41 in the touch wiring area 11, but the wiring layer does not include a wiring structure in the touch sensing area 12.

Figure 3:
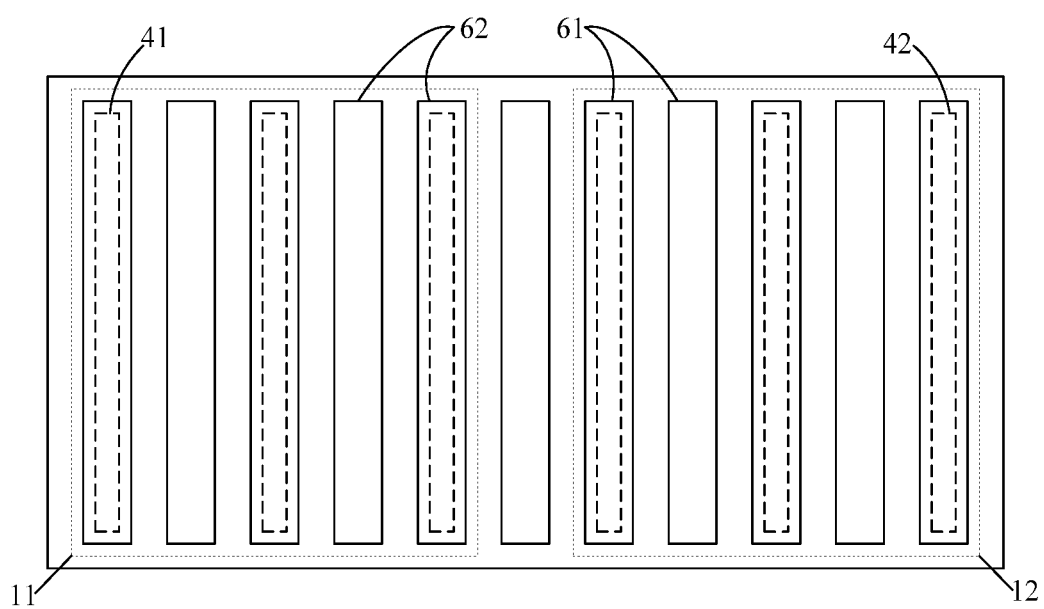
FIG. 3 is a schematic view illustrating a projection of a wiring layer and an electrode layer projected on an encapsulation layer of the touch display panel according to one embodiment of the present application.
Figure 4:
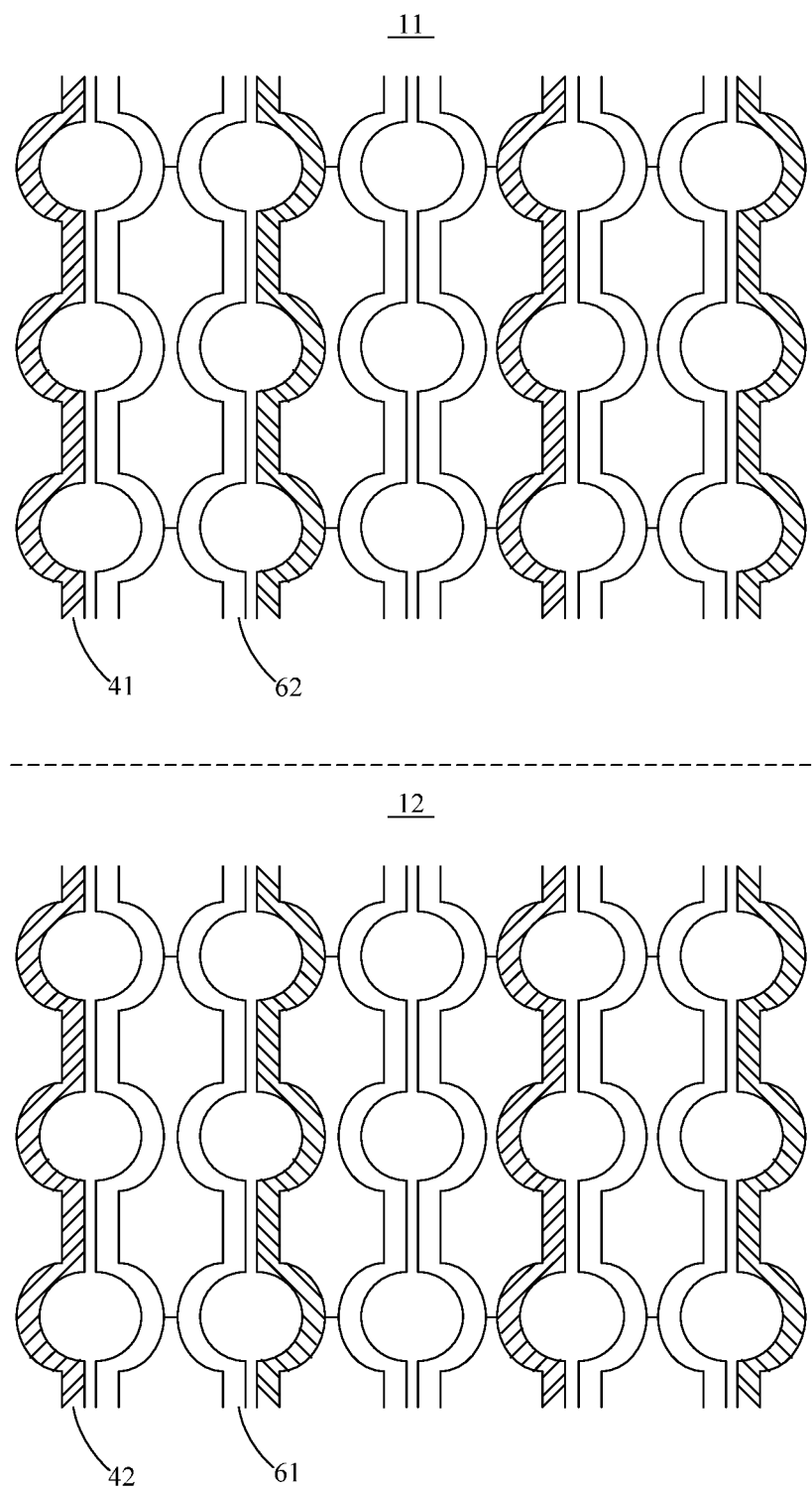
FIG. 4 is a schematic view illustrating the projection of the wiring layer and the electrode layer projected on the encapsulation layer of the touch display panel according to another embodiment of the present application.
Figure 5:
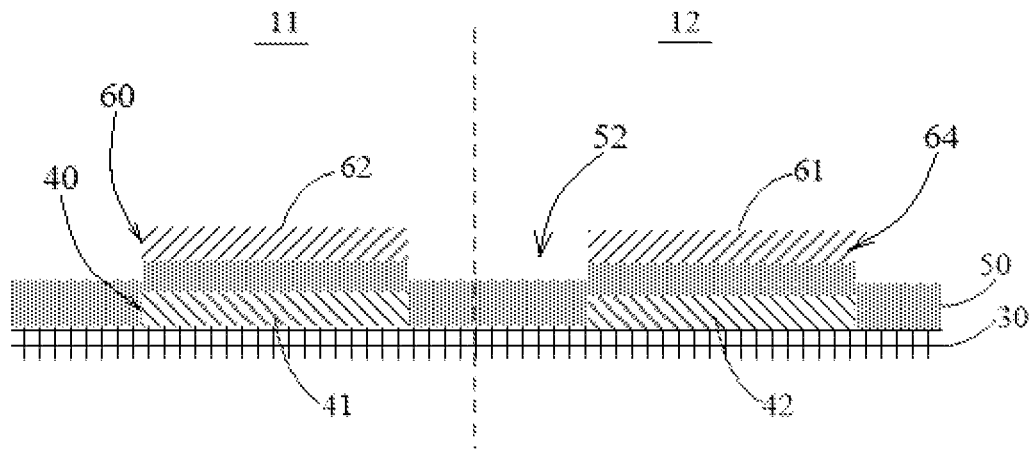
FIG. 5 is a schematic cross-sectional view of the touch display panel according to one embodiment of the present application.

Accordingly, please refer to FIGS. 3, 4, and 5. FIG. 3 is a schematic view of a projection of a wiring layer and an electrode layer projected on an encapsulation layer of a touch display panel according to one embodiment of the present application. FIG. 4 is a schematic view of the projection of the wiring layer and the electrode layer projected on the encapsulation layer of the touch display panel according to another embodiment of the present application. FIG. 5 is a schematic cross-sectional view of the touch display panel according to one embodiment of the present application. The touch display panel 100 of the present application includes: the wiring layer 40 and the electrode layer 60 stacked on the encapsulation layer 30 of the touch display panel 100. The wiring layer 40 includes a plurality of touch signal lines 41 and a plurality of dummy lines 42. The touch signal lines 41 and the dummy lines 42 are arranged in parallel. The electrode layer 60 includes a plurality of electrode lines 64. In the projection of the wiring layer 40 and the electrode layer 60 projected on the encapsulation layer 30, at least one electrode line 64 is disposed between two adjacent touch signal lines 41, and at least one electrode line 64 is disposed between two adjacent dummy lines 42. A difference between a number of the at least one electrode line 64 between two adjacent touch signal lines 41 and a number of the at least one electrode line 64 between two adjacent dummy lines 42 is less than or equal to 1. An insulating layer 50 is disposed between the wiring layer 40 and the electrode layer 60, a plurality of conductive holes 52 are defined in the insulating layer 50, and the electrode lines 64 and the touch signal lines 41 are connected through the conductive holes 52.

Specifically, in the present embodiment, the encapsulation layer 30 can be a thin film encapsulation layer for encapsulating a thin film transistor array substrate. The present application does not limit a specific positional relationship between the wiring layer 40 and the electrode layer 60 and the encapsulation layer 30. The wiring layer 40 can be disposed between the electrode layer 60 and the encapsulation layer 30, or the electrode layer 60 can be disposed between the wiring layer 40 and the encapsulation layer 30. It is only required that the wiring layer 40 and the electrode layer 60 are stacked on the encapsulation layer 30 of the touch display panel 100. In one example, the wiring layer 40 is disposed on the encapsulation layer 30, and the electrode layer 60 is disposed on one side of the wiring layer 40 away from the encapsulation layer 30.

The wiring layer 40 includes not only the touch signal lines 41 arranged in the touch wiring area 11, but also the dummy lines 42 arranged in the touch sensing area 12. The dummy lines 42 are not used for actual connection, and are only used for increasing a wiring density of the wiring layer 40 in the touch sensing area 12. Since the dummy lines 42 are added in the wiring layer 40 of the touch sensing area 12, an interlayer structure in the touch sensing area 12 is more consistent with an interlayer structure in the touch wiring area 11, thereby reducing a structural difference between the touch sensing area 12 and the touch wiring area 11. As a result, the present application can reduce a difference in reflection performance between the touch sensing area 12 and the touch wiring area 11. Consequently, after the touch display panel 100 undergoes the reliability test, the dark lines can be reduced, thereby improving the display performance of the touch display panel 100 and improving the factory pass rate.

The electrode lines 64 include multiple touch electrodes 61 and multiple dummy electrodes 62. The touch electrodes 61 and the dummy electrodes 62 are arranged in parallel. The touch signal lines 41 are electrically connected to the touch electrodes 61. It should be noted that, the touch sensing area 12 refers to an area where the touch electrodes 61 are arranged in the electrode layer 60. Since the wiring layer 40 and the electrode layer 60 are arranged in separate layers spaced apart, the touch signal lines 41 in the wiring layer 40 can also be located in the touch sensing area 12, and the dummy lines 42 can also be located in the touch wiring area 11, as long as the touch signal lines 41 and the touch electrodes 61 are connected to each other through the conductive holes 52 of the insulating layer 50.

The display area 10 includes multiple touch sensing areas 12. Each touch sensing area 12 is provided with multiple touch electrodes 61, so that the touch electrodes 61 in each touch sensing area 12 are combined into a touch sensing unit. Each touch sensing unit needs to transmit touch signals to the touch integrated circuit through one touch signal line 41. It can be understood that a total number of the touch signal lines 41 and the dummy lines 42 is actually less than a number of the electrode lines.

Figure 6:
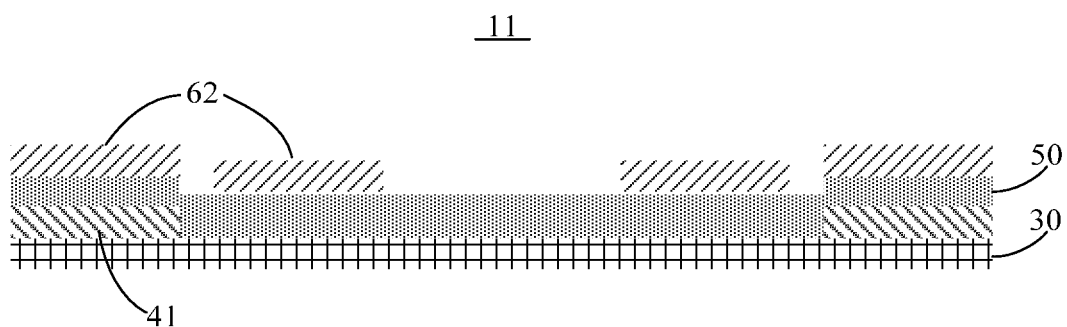
FIG. 6 is a schematic cross-sectional view of a touch wiring area according to one embodiment of the present application.
Figure 7:
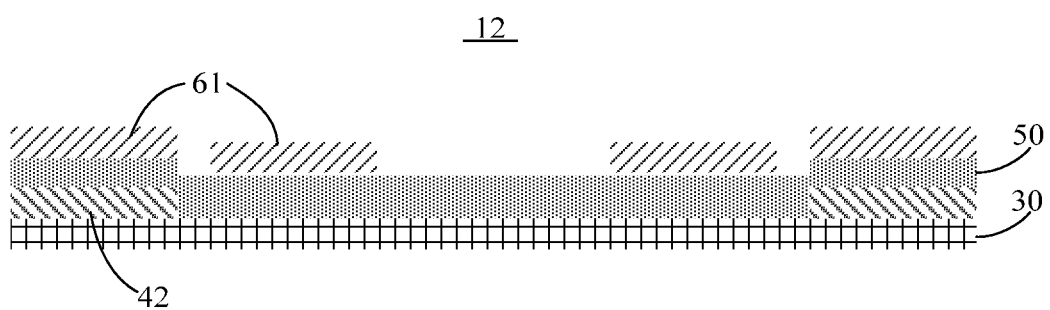
FIG. 7 is a schematic cross-sectional view of a touch sensing area according to one embodiment of the present application.

Specifically, please refer to FIG. 6 and FIG. 7 together. FIG. 6 is a schematic cross-sectional view of the touch wiring area according to one embodiment of the present application. FIG. 7 is a schematic cross-sectional view of the touch sensing area according to one embodiment of the present application. The wiring layer includes multiple touch signal lines 41 and multiple dummy lines 42, and the touch signal lines 41 and the dummy lines 42 are arranged in parallel. In the projection of the wiring layer and the electrode layer projected on the encapsulation layer 30, at least one electrode line is disposed between two adjacent touch signal lines 41, and at least one electrode line is disposed between two adjacent dummy lines 42. A difference between a number of the at least one electrode line disposed between two adjacent touch signal lines 41 and a number of the at least one electrode line disposed between two adjacent dummy lines 42 is less than or equal to 1.

For example, the touch signal lines 41 are disposed in the touch wiring area, and the dummy lines 42 are disposed in the touch sensing area 12. In the projection projected on the encapsulation layer 30, if the difference between the number of the at least one electrode line disposed between two adjacent touch signal lines 41 and the number of the at least one electrode line disposed between two adjacent dummy lines 42 is less than or equal to 1. It means that a distribution density of the touch signal lines 41 is close to and substantially same as a distribution density of the dummy lines 42. In this way, the present application further reduces a wiring difference between the touch wiring area 11 and the touch sensing area 12 in the wiring layer and also reduces a difference in reflective performance between an area where the touch signal lines 41 are located and an area where the dummy lines 42 are located. As a result, after the touch display panel 100 undergoes the reliability test, the dark lines caused by the difference in the reflective performance between different areas can be effectively decreased to improve the display performance of the touch display panel 100.

A projected shape of each of the touch signal lines 41 projected on the encapsulation layer 30 can be same as or different from a projected shape of each of the dummy lines 42 projected on the encapsulation layer 30. For example, the projected shape of each of the touch signal lines 41 projected on the encapsulation layer 30 is the same as the projected shape of each of the dummy lines 42 projected on the encapsulation layer 30. A projected shape of the touch signal lines 41 and the dummy lines 42 projected on the encapsulation layer 30 shows respective wiring rules of the touch signal lines 41 and the dummy lines 42. The wiring rules can be made the same to further reduce a structural difference between the touch signal lines 41 in the touch wiring area 11 and the dummy lines 42 in the touch sensing area 12, thereby further eliminating the difference in the reflective performance between the touch wiring area 11 and the touch sensing area 12, thus further reducing the dark lines that appear on the touch display panel 100 after the reliability test.

A cross-sectional width of each of the touch signal lines 41 can be same as or different from a cross-sectional width of each of the dummy lines 42. For example, a difference between the cross-sectional width of the touch signal line 41 and the cross-sectional width of the dummy line 42 is less than or equal to 5 nanometers. In this way, the cross-sectional width of the touch signal line 41 and the cross-sectional width of the dummy line 42 can be approximately the same, so the structural difference between the touch signal lines 41 in the touch wiring area 11 and the dummy lines 42 in the touch sensing area 12 can be further reduced, and the difference in the reflection performance between the touch wiring area 11 and the touch sensing area 12 can be further eliminated, which further reduces the dark lines appearing after the reliability test of the touch display panel 100.

For example, please refer to FIG. 5, which is a schematic cross-sectional view of the touch display panel according to one embodiment of the present application. The projection of each touch signal line 41 projected on the encapsulation layer 30 is located within the projection of one of the electrode lines, and the projection of each of the dummy lines 42 projected on the encapsulation layer 30 is located within the projection of one of the electrode lines. In this way, the inter-layer structural difference between the area where the touch signal lines 41 are located and the area where the dummy lines 42 are located can be reduced, so as to further eliminate the difference in the reflective performance between the touch wiring area 11 and the touch sensing area 12, thereby further reducing the dark lines appearing on the touch display panel 100 after the reliability test.

For example, as shown in FIG. 3, in the projection of the wiring layer and the electrode layer projected on the encapsulation layer 30, each electrode line between two adjacent touch signal lines 41 is one of the dummy electrodes 62, and each electrode line between two adjacent dummy lines 42 is one of the touch electrodes 61.

It can be understood that the dummy electrodes 62 have neither the touch sensing function nor the signal connection function, and are only provided to reduce the wiring structural difference between the touch sensing area 12 and the touch wiring area 11 of the electrode layer. That is to say, the dummy electrodes 62 are located in the touch wiring area 11 of the electrode layer.

The dummy electrodes 62 can reduce the structural wiring difference between the touch sensing area 12 and the touch wiring area 11 in the electrode layer, so as to reduce the difference in the reflection performance between the touch sensing area 12 and the touch wiring area 11, thereby reducing the dark lines resulting from the difference in the reflection performance between different areas after the panel 100 undergoes the reliability test. Accordingly, the present application can improve the display performance of the touch display panel 100.

The distribution density of the touch electrodes 61 in the touch sensing area 12 can be the same as or different from the distribution density of the dummy electrodes 62 in the touch wiring area 11. In one example, a difference between a distance between two adjacent touch electrodes 61 and a distance between two adjacent dummy electrodes 62 is less than or equal to 5 nanometers. When the difference between the distance between two adjacent touch electrodes 61 and the distance between two adjacent dummy electrodes 62 is less than or equal to 5 nanometers, it means that the distribution density of the touch electrodes 61 is close to and almost the same as the distribution density of the dummy electrodes 62. In this way, the present application can further reduce the wiring layout difference between the touch wiring area 11 and the touch sensing area 12 in the electrode layer, thus further reducing the difference in the reflection performance between the area where the touch electrodes 61 are located and the area where the dummy electrodes 62 are located. As a result, the present application can effectively reduce the dark lines appearing after the touch display panel 100 undergoes the reliability test due to the difference in the reflective performance between different areas. Accordingly, the present application can improve the display performance of the touch display panel 100.

A projected shape of each of the touch electrodes 61 projected on the encapsulation layer 30 can be the same as or different from a projected shape of each of the dummy electrodes 62 projected on the encapsulation layer 30. In one example, the projected shape of each of the touch electrodes 61 projected on the encapsulation layer 30 is the same as the projected shape of each of the dummy electrodes 62 projected on the encapsulation layer 30. A projected shape of the touch electrodes 61 and the dummy electrodes 62 on the encapsulation layer 30 shows respective wiring rules of the touch electrodes 61 and the dummy electrodes 62. The wiring rules are the same, thus further reducing a structural wiring difference between the touch electrodes 61 in the touch sensing area 12 and the dummy electrodes 62 in the touch wiring area 11, thereby further eliminating the difference in the reflection performance between the touch wiring area 11 and the touch sensing area 12. Consequently, the present application can further reduce the dark lines which appear after the reliability test of the touch display panel 100.

A cross-sectional width of each of the touch electrodes 61 can be the same as or different from a cross-sectional width of each of the dummy electrodes 62. In one example, the difference between the cross-sectional width of the touch electrode 61 and the cross-sectional width of the dummy electrode 62 is less than or equal to 5 nanometers. In this way, the cross-sectional width of the touch electrode 61 is almost the same as the cross-sectional width of the dummy electrode 62, which can further reduce the structural difference between the touch electrodes 61 in the touch sensing area 12 and the dummy electrodes 62 in the touch wiring area 11, thus further eliminating the difference in the reflection performance between the touch wiring area 11 and the touch sensing area 12. Accordingly, the present application can further reduce the dark lines which appear after the reliability test of the touch display panel 100.

For example, as shown in FIG. 3 and FIG. 4, the projection of each touch signal line 41 projected on the encapsulation layer 30 is located within the projection of one of the dummy electrodes 62. The projection of each dummy line 42 projected on the encapsulation layer 30 is located within the projection of one of the touch electrodes 61. In this way, the present application can further reduce the inter-layer structural difference between the area where the touch signal lines 41 are located and the area where the dummy lines 42 are located, thus further eliminating the difference in the reflection performance between the touch wiring area 11 and the touch sensing area 12. Consequently, the present application can further reduce the dark lines appearing on the touch display panel 100 after the touch control display panel 100 undergoes the reliability test.

For example, the projected shape of each touch signal line 41 projected on the encapsulation layer 30 is the same as the projected shape of one of the dummy electrodes 62 projected on the encapsulation layer 30, and the projected shape of each dummy line 42 projected on the encapsulation layer 30 is the same as the projected shape of one of the touch electrodes 61 projected on the encapsulation layer 30. In this way, the present application can reduce the inter-layer structural difference between the electrode layer and the wiring layer, thereby reducing the difference in the reflection performance of the interlayer structure of the touch display panel 100. As a result, the present application can effectively reduce the dark lines which appear due to the difference in the reflection performance between different areas after the touch display panel 100 undergoes the reliability test.

Accordingly, the present application can improve the display performance of the touch display panel 100.

Figure 8:
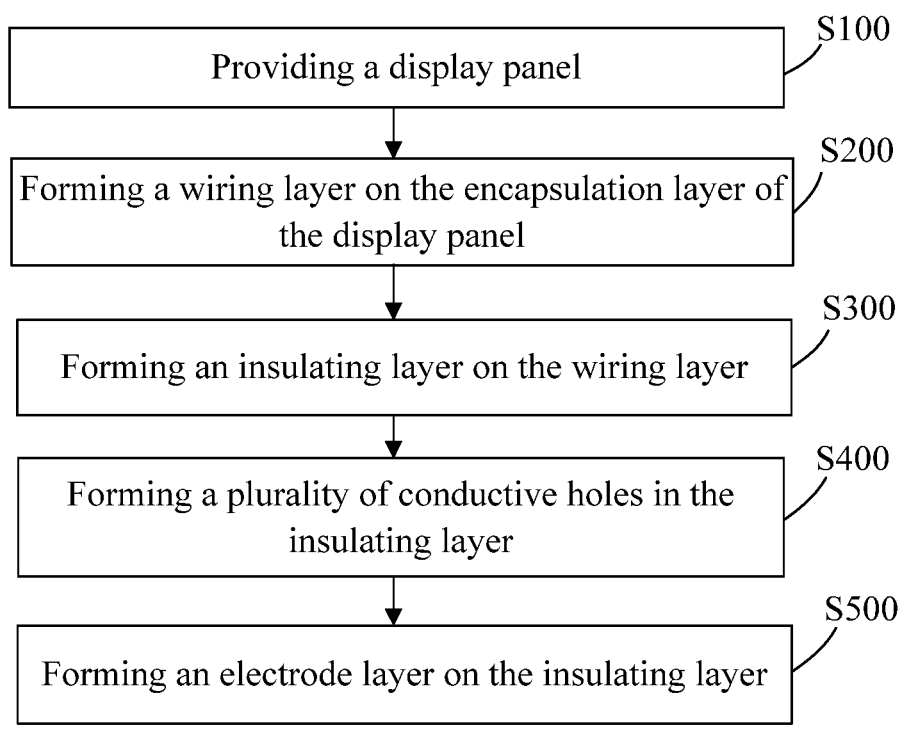
FIG. 8 is a process flow diagram of a manufacturing method of the touch display panel according to one embodiment of the present application.

In one example, please refer to FIG. 8, which is a schematic process flow diagram of a manufacturing method of a touch display panel 100 according to one embodiment of the present application. The present application further provides the manufacturing method of the touch display panel 100, which is used to manufacture the above touch display panel 100. The manufacturing method of the touch display panel 100 includes:

S100: providing a display panel;

S200: forming a wiring layer on the encapsulation layer 30 of the display panel, wherein the wiring layer includes a plurality of touch signal lines 41 and a plurality of dummy lines 42, and the touch signal lines 41 and the dummy lines 42 are arranged in parallel;

S300: forming an insulating layer 50 on the wiring layer;

S400: forming a plurality of conductive holes in the insulating layer 50;

S500: forming an electrode layer on the insulating layer 50, wherein the electrode layer includes a plurality of electrode lines; in a projection of the wiring layer and the electrode layer projected on the encapsulation layer 30, at least one electrode line is located between two adjacent touch signal lines 41, and at least one electrode line is located between two adjacent dummy lines 42; and a difference between a number of the at least one electrode line disposed between two adjacent touch signal lines 41 and a number of the at least one electrode line disposed between two adjacent dummy lines 42 is less than or equal to 1.

In step S200, after cleaning and drying a surface of the encapsulation layer 30, a metal material film is deposited on the surface of the encapsulation layer 30 by using a physical vapor deposition (PVD) process for depositing a metal material. Parameters such as thickness can be realized by means of, for example, adjusting relevant process parameters. On this basis, a patterning treatment is performed on the metal material film disposed on the whole surface, described as follows. A layer of photoresist (here, a positive photoresist, for example) is applied to the unpatterned metal material film by means of spin coating. The photoresist in all areas to be etched is irradiated and fully exposed by using ultraviolet light passing through a mask, and then is placed in the developer to remove all the photoresist in the areas to be etched by developing. The remaining photoresist is used as a mask to etch the unpatterned wiring layer. After the etching is completed, the remaining photoresist is removed to form the patterned wiring layer. The wiring layer can be made of metal with low resistivity such as Mo, Al, Au, Ag, and Cu.

Step S300 includes performing a chemical vapor deposition process (CVD) on the encapsulation layer 30 and the wiring layer to deposit the insulating layer 50 covering the encapsulation layer 30 and the wiring layer by. A thickness of the insulating layer 50 may need to meet relevant requirements for a thickness of the touch display panel 100. Parameters such as a film layer thickness can be realized by, for example, adjusting relevant process parameters. The insulating layer 50 can be made of inorganic insulating materials such as silicon oxide, silicon nitride, and silicon oxynitride.

Step S400 includes coating a layer of photoresist on the insulating layer 50 by, for example, spin coating. The photoresist in the entire via hole area is irradiated and fully exposed by using ultraviolet light passing through a mask. Then, the photoresist is placed in a developer, so that the photoresist in the via hole area is completely removed by developing, the insulating layer 50 is etched by using the remaining photoresist as a mask, and the remaining photoresist is removed after the etching is completed.

In step S500, a metal material film is deposited on the insulating layer 50 by a physical vapor deposition process (PVD) for depositing a metal material. Parameters such as a film thickness can be realized by, for example, adjusting relevant process parameters. On this basis, a patterning treatment is performed on the metal material film disposed on the whole surface, described as follows. A layer of photoresist (here, a positive photoresist as an example) is applied to the unpatterned metal material film by means of spin coating. The photoresist in all the areas to be etched is irradiated and fully exposed using ultraviolet light passing through a mask, and then is placed in a developer to remove all the photoresist in the areas to be etched by developing. The remaining photoresist is used as a mask to etch the unpatterned electrode layer. After the etching is completed, the remaining photoresist is removed to form the patterned electrode layer. The electrode layer can be made of a transparent conductive material such as indium tin oxide (ITO).

In one example, the present application further provides a touch display device. The touch display device includes a controller, a driving circuit, and the touch display panel 100 as described above. The controller is connected to the driving circuit, and the driving circuit is connected to the touch display panel 100. The touch display device can be any product or device with a display function, such as electronic paper, mobile phones, tablet computers, televisions, monitors, notebook computers, digital photo frames, and navigators.

In the touch display panel of the present application, the dummy lines 42 in the same layer as the touch signal lines 41 are added in the wiring layer. In the projection of the wiring layer and the electrode layer projected on the encapsulation layer 30, the difference between the number of the electrode lines disposed between the touch signal lines 41 and the number of the electrode lines disposed between two adjacent dummy lines 42 is less than or equal to 1, so that the distribution density of the touch signal lines 41 is close to or the same as the distribution density of the dummy lines 42. In this way, the present application reduces a structural wiring difference between the area where the touch signal lines 41 is located and the area where the dummy lines 42 are located in the touch display panel 100, thus reducing the difference in the reflection performance between the area where the touch signal lines 41 are located and the area where the dummy lines 42 are located. Accordingly, after the touch display panel 100 undergoes the reliability test, the present application can effectively reduce the dark lines which appear due to the difference in the reflection performance between different areas after the touch display panel 100 undergoes a reliability test, so as to improve the display performance of the touch display panel 100.

In the above-mentioned embodiments, the description of each embodiment has its own emphasis. For those that are not described in detail in a certain embodiment, reference can be made to the relevant descriptions of other embodiments.

In the description of the present application, wordings like "first" and "second" are only used for descriptive purposes, and cannot be understood as indicating or implying relative importance or implying the number of the indicated technical feature. Thus, a feature defined as "first" or "second" can expressly or implicitly include one or more of the feature.

The touch display panel of the present application has been introduced in detail above. Working principles and embodiments of the present application are described with specific examples. Those skilled in the art can change the specific embodiments and the application range according to the ideas of the present application. In conclusion, the content of this specification should not be construed as a limitation to the present application.

What is claimed is:

1. A touch display panel, comprising:
   a wiring layer and an electrode layer, wherein the wiring layer and the electrode layer are stacked on the encapsulation layer of the touch display panel, the wiring layer comprises a plurality of touch signal lines and a plurality of dummy lines, the plurality of touch signal lines and the plurality of the dummy lines are arranged in parallel, and the electrode layer comprises a plurality of electrode lines, wherein in a projection of the wiring layer and the electrode layer projected on the encapsulation layer, at least one electrode line is disposed between two adjacent touch signal lines, and at least one electrode line is disposed between two adjacent dummy lines, and wherein a difference between a number of the at least one electrode line disposed between two adjacent touch signal lines and a number of the at least one electrode line disposed between two adjacent dummy lines is less than or equal to 1; and
   an insulating layer disposed between the wiring layer and the electrode layer, wherein a plurality of conductive holes are defined in the insulating layer, and the plurality of electrode lines and the plurality of touch signal lines are connected through the plurality of conductive holes.

2. The touch display panel according to claim 1, wherein a projected shape of each of the touch signal lines projected on the encapsulation layer is same as a projected shape of each of the dummy lines projected on the encapsulation layer.

3. The touch display panel according to claim 1, wherein a difference between a cross-sectional width of each of the touch signal lines and a cross-sectional width of each of the dummy lines is less than or equal to 5 nanometers.

4. The touch display panel according to claim 1, wherein a projection of each of the touch signal lines projected on the encapsulation layer is located within a projection of one of the electrode lines, and a projection of each of the dummy lines projected on the encapsulation layer is located within the projection of one of the electrode lines.

5. The touch display panel according to claim 1, wherein the plurality of electrode lines comprise a plurality of touch electrodes and a plurality of dummy electrodes, the plurality of touch electrodes and the plurality of dummy electrodes are arranged parallel to each other, and the plurality of touch signal lines are electrically connected to the plurality of touch electrodes; and
   in the projection of the wiring layer and the electrode layer projected on the encapsulation layer, each of the at least one electrode line disposed between two adjacent touch signal lines is one of the dummy electrodes, and each of the at least one electrode line disposed between two adjacent dummy lines is one of the touch electrodes.

6. The touch display panel according to claim 5, wherein a projected shape of each of the touch electrodes projected on the encapsulation layer is same as a projected shape of each of the dummy electrodes projected on the encapsulation layer.

7. The touch display panel according to claim 5, wherein a difference between a cross-sectional width of each of the touch electrodes and a cross-sectional width of each of the dummy electrodes is less than or equal to 5 nanometers.

8. The touch display panel according to claim 5, wherein a projection of each of the touch signal lines projected on the encapsulation layer is located within a projection of one of the dummy electrodes, and a projection of each of the dummy lines projected on the encapsulation layer is located within a projection of one of the touch electrodes.

9. The touch display panel according to claim 1, wherein the wiring layer is disposed on the encapsulation layer, and the electrode layer is disposed on one side of the wiring layer away from the encapsulation layer.

10. A touch display device, comprising:
    a controller, a driving circuit, and a touch display panel, wherein the controller is connected to the driving circuit, and the driving circuit is connected to the touch display panel;
    wherein the touch display panel comprises:
    a wiring layer and an electrode layer, wherein the wiring layer and the electrode layer are stacked on the encapsulation layer of the touch display panel, the wiring layer comprises a plurality of touch signal lines and a plurality of dummy lines, the plurality of touch signal lines and the plurality of the dummy lines are arranged in parallel, and the electrode layer comprises a plurality of electrode lines, wherein in a projection of the wiring layer and the electrode layer projected on the encapsulation layer, at least one electrode line is disposed between two adjacent touch signal lines, and at least one electrode line is disposed between two adjacent dummy lines, and wherein a difference between a number of the at least one electrode line disposed between two adjacent touch signal lines and a number of the at least one electrode line disposed between two adjacent dummy lines is less than or equal to 1; and
    an insulating layer disposed between the wiring layer and the electrode layer, wherein a plurality of conductive holes are defined in the insulating layer, and the plurality of electrode lines and the plurality of touch signal lines are connected through the plurality of conductive holes.

11. The touch display device according to claim 10, wherein a projected shape of each of the touch signal lines projected on the encapsulation layer is same as a projected shape of each of the dummy lines projected on the encapsulation layer.

12. The touch display device according to claim 10, wherein a difference between a cross-sectional width of each of the touch signal lines and a cross-sectional width of each of the dummy lines is less than or equal to 5 nanometers.

13. The touch display device according to claim 10, wherein a projection of each of the touch signal lines projected on the encapsulation layer is located within a projection of one of the electrode lines, and a projection of each of the dummy lines projected on the encapsulation layer is located within the projection of one of the electrode lines.

14. The touch display device according to claim 10, wherein the plurality of electrode lines comprise a plurality of touch electrodes and a plurality of dummy electrodes, the plurality of touch electrodes and the plurality of dummy electrodes are arranged parallel to each other, and the plurality of touch signal lines are electrically connected to the plurality of touch electrodes; and in the projection of the wiring layer and the electrode layer projected on the encapsulation layer, each of the at least one electrode line disposed between two adjacent touch signal lines is one of the dummy electrodes, and each of the at least one electrode line disposed between two adjacent dummy lines is one of the touch electrodes.

15. The touch display device according to claim 14, wherein a projected shape of each of the touch electrodes projected on the encapsulation layer is same as a projected shape of each of the dummy electrodes projected on the encapsulation layer.

16. The touch display device according to claim 14, wherein a difference between a cross-sectional width of each of the touch electrodes and a cross-sectional width of each of the dummy electrodes is less than or equal to 5 nanometers.

17. The touch display device according to claim 14, wherein a projection of each of the touch signal lines projected on the encapsulation layer is located within a projection of one of the dummy electrodes, and a projection of each of the dummy lines projected on the encapsulation layer is located within a projection of one of the touch electrodes.

18. The touch display device according to claim 10, wherein the wiring layer is disposed on the encapsulation layer, and the electrode layer is disposed on one side of the wiring layer away from the encapsulation layer.

* * * * *